(12) United States Patent
Choi

(10) Patent No.: US 6,781,658 B1
(45) Date of Patent: Aug. 24, 2004

(54) REFLECTION TYPE LIQUID CRYSTAL DISPLAY DEVICE HAVING A HIGH APERTURE RATIO

(75) Inventor: Woong Sik Choi, Ansan-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/448,277

(22) Filed: Nov. 24, 1999

(30) Foreign Application Priority Data

Nov. 27, 1998 (KR) ........................................ 1998-51185

(51) Int. Cl.⁷ ...................... G02F 1/1343; G02F 1/136
(52) U.S. Cl. ...................... 349/139; 349/143; 349/42
(58) Field of Search ................................ 349/139, 143, 349/42, 43, 38; 438/30

(56) References Cited

U.S. PATENT DOCUMENTS

| | | | | |
|---|---|---|---|---|
| 5,757,444 A | * | 5/1998 | Takemura | 349/38 |
| 5,953,088 A | * | 9/1999 | Hanazawa et al. | 349/110 |
| 5,995,178 A | * | 11/1999 | Fujikawa et al. | 349/55 |
| 6,226,057 B1 | * | 5/2001 | Lee | 349/38 |
| 6,262,783 B1 | * | 7/2001 | Tsuda et al. | 349/39 |
| 6,262,784 B1 | * | 7/2001 | Kim | 349/43 |
| 6,326,641 B1 | * | 12/2001 | Choi | 257/57 |

FOREIGN PATENT DOCUMENTS

| | | |
|---|---|---|
| JP | 09-179141 | 7/1997 |
| KR | 1997-0048828 | 7/1997 |

* cited by examiner

Primary Examiner—Kenneth Parker
Assistant Examiner—Mike Qi
(74) Attorney, Agent, or Firm—McKenna Long & Aldridge

(57) ABSTRACT

A reflection type liquid crystal display device includes first and second gate lines, first and second data lines intersecting said first and second gate lines, an insulating layer covering said data lines, and a pixel electrode overlapping the first and second data lines in order to increase the aperture ratio. The overlapped area between the pixel electrode and the first data line and the areas between the pixel electrode and the second data line are substantially the same with each other. Each overlapped area covers substantially half of the length of the data line. Consequently, the reflective pixel electrodes cover the data lines substantially on the whole.

22 Claims, 3 Drawing Sheets

REFLECTION TYPE LIQUID CRYSTAL DISPLAY DEVICE HAVING A HIGH APERTURE RATIO

CROSS REFERENCE TO RELATED ART

This application claims the benefit of Korean Patent Application No. 1998-51185, filed on Nov. 27, 1998 which is hereby incorporated by reference.

BACKGROUND OF THE INVENTION

1. Field of the Invention

The present invention relates to a liquid crystal display (LCD) device, and more particularly to a reflection type liquid crystal display device having a high aperture ratio.

2. Description of the Related Art

An aperture ratio of a liquid crystal display device is a rate of an area which a light penetrates with respect to an entire area of the pixel, and is important for picture quality of the device. One of the methods for increasing the aperture ratio of the reflection type LCD device is shown in FIGS. 1 and 2, where the reflective pixel electrode 10 is extending over the data lines 2 and 4.

FIG. 1 is a plan view of a pixel module 100 of a conventional liquid crystal display device. FIG. 2 is a sectional view of the active matrix display device taken along a line of FIG. 1. Module 100 is positioned in between gate lines 6 and 8 adapted for carrying gate drive signals to the pixel modules and data lines 2 and 4 adapted for delivering data signals to the pixel modules. Gate line 8 has a gate electrode 18, data line 2 has a source electrode 12, and reflective pixel electrode 10 is connected to drain electrode 14 of TFT "T" through contact hole.

As shown in FIGS. 1 and 2, in order to increase the aperture ratio, the pixel electrode 10 overlaps the data lines 2 and 4, and the aperture ratio of the device is increased by the overlapped length ΔL.

However, since reflective pixel electrode 10 and adjacent pixel electrodes 10a and 10b overlap data lines 2 and 4, respectively, the overlapped length ΔL is limited to taking into account misalignment of margin "A", which is about 4 μm. Furthermore, if a misalignment happens during the fabrication process, the parasitic capacitance of the overlapped portion varies, which may cause a vertical crosstalk.

SUMMARY OF THE INVENTION

An object of the present invention is to provide a reflection type LCD device having a high aperture ratio.

Another object of the present invention is to provide a reflection type LCD device which can minimize reflection by data lines.

Another object of the present invention is to provide a reflection type LCD device which can minimize crosstalk.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to one preferred embodiment of the present invention, a liquid crystal display device comprises a substrate; first and second gate lines formed on the substrate; first and second data lines intersecting the first and second gate lines so as to define a pixel region, wherein each one of the first and the second data lines has longitudinally separated first and second regions; an insulating film covering the first and the second gate lines and the first and the second data lines; a switching element disposed in the pixel region and connected between the second gate line and the pixel electrode; and a pixel electrode disposed in the pixel region and overlapping at least one of the first and the second regions of the first and second data lines. The liquid crystal display device is driven by an alternating current driving method.

According to one aspect of the present invention, the pixel electrode overlaps the first and the second data lines by whole width of the data lines and by a substantially half length of the data lines. The pixel electrode is a reflective pixel electrode. Preferably, the first and the second regions of the data lines are approximately the same in size. The pixel electrode extends over the first region of the first data line and extends over the second region of the second data line.

A method of manufacturing a liquid crystal display device of the present invention comprises the steps of providing a substrate; forming first and second gate lines on the substrate; forming first and second data lines to intersect the first and second gate lines so as to define a pixel region, wherein each one of the first and the second data lines has longitudinally separated first and second regions; forming an insulating film over the first and the second gate lines and the first and the second data lines; forming a switching element in the pixel region and connected between the second gate line and the pixel electrode; and forming a pixel electrode in the pixel region to overlap at least one of the first and the second regions of the first and second data lines.

Other elements, features, advantages and components of preferred embodiments of the present invention will be described in farther detail with reference to the drawings attached hereto.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate preferred embodiments of the present invention and, together with the description, serve to explain the principles of the present invention.

DESCRIPTION OF THE PREFERRED EMBODIMENTS

The preferred embodiment of the present invention will be explained with reference to the accompanying drawings.

Figure 1:
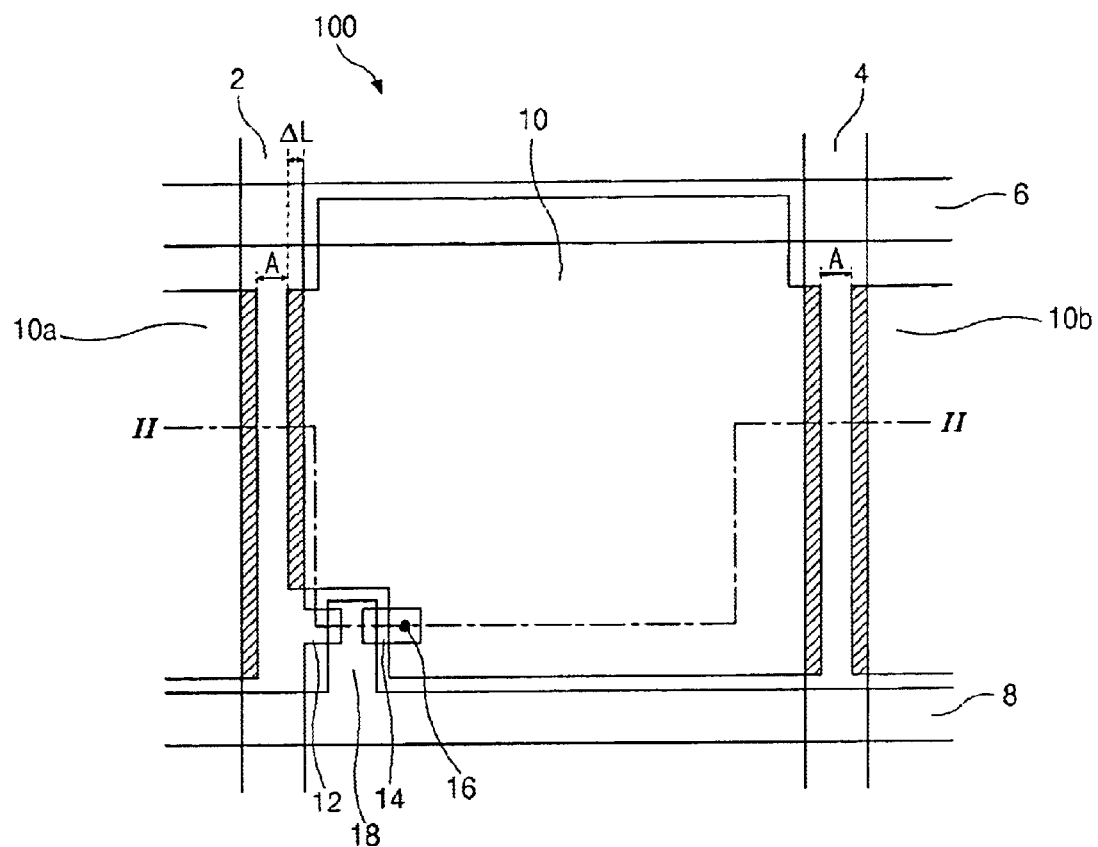
FIG. 1 is a plan view of a reflection type active matrix display device according to the prior art.
Figure 2:
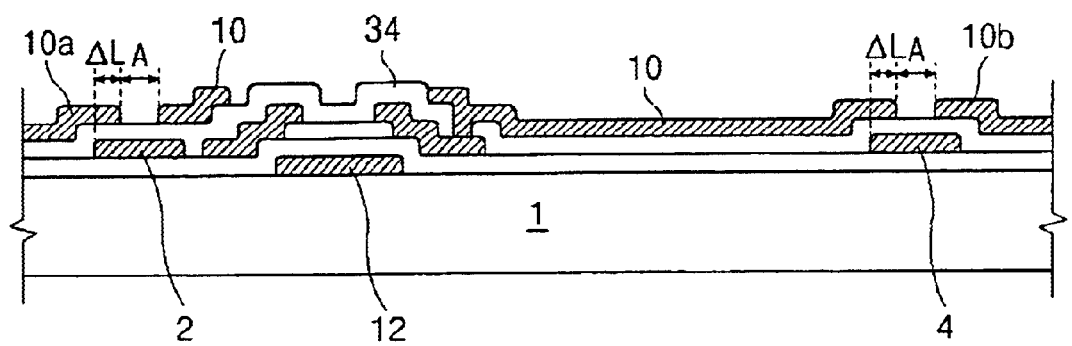
FIG. 2 is a sectional view of the active matrix display device taken along line II—II of FIG. 1.
Figure 3:
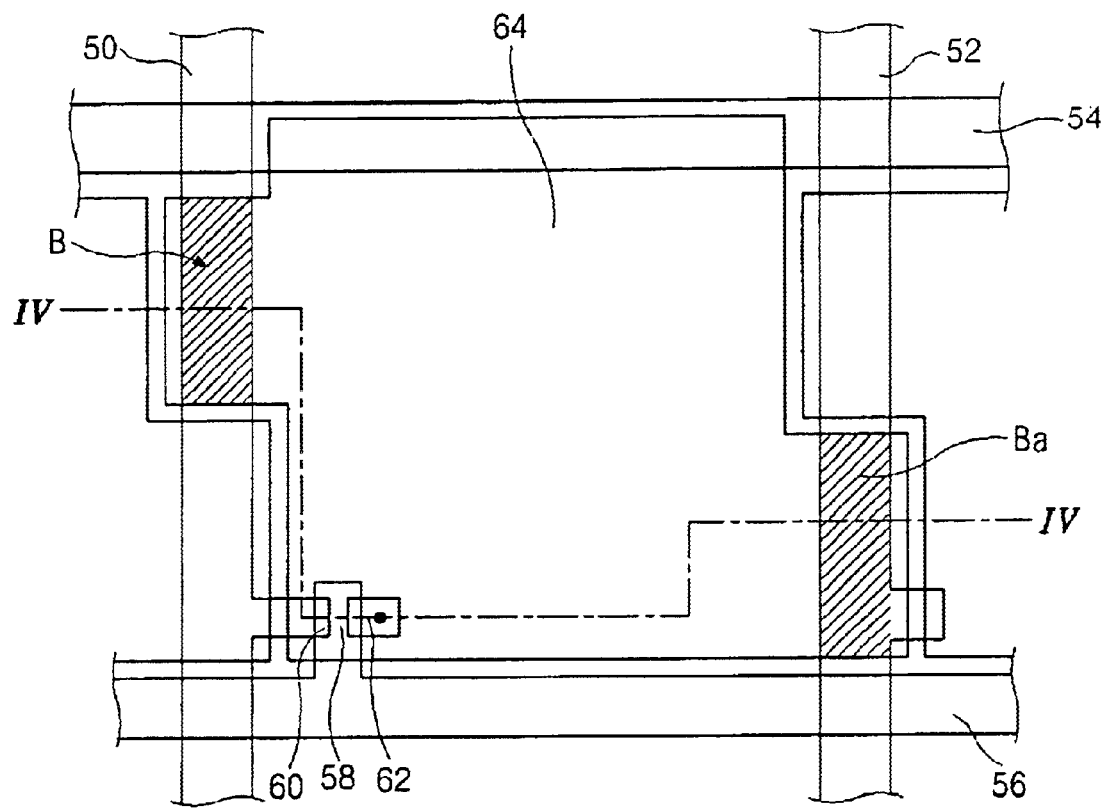
FIG. 3 is a plan view a reflection type active matrix display device according to the present invention.
Figure 4:
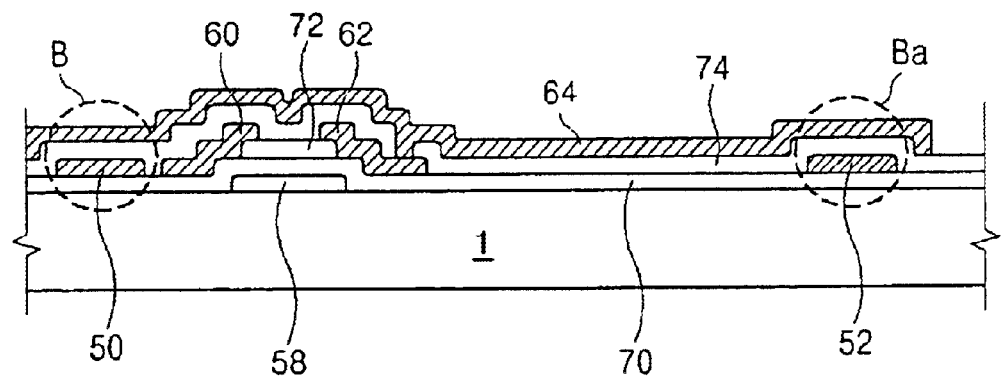
FIG. 4 is a sectional view of the active matrix display device taken along line IV—IV of FIG. 5.

FIG. 3 shows a pixel of the reflection type active matrix LCD device according to an embodiment of the present invention. FIG. 4 is a sectional view taken along line IV—IV of FIG. 3.

First data line 50 and second data lines 52 are extending along in a matrix column direction. In a matrix row direction, first and second gate lines 56 and 54 are shown. Two data lines 50 and 52 and two gate lines 56 and 54 define a pixel region. The data line 50 (52) is connected to a source electrode 60. The gate line 56 (52) is connected to a gate electrode 58. A reflective pixel electrode 64 electrically contacts drain electrode 62 through a contact hole 63 on drain electrode 62.

The thin film transistor includes active layer 72, gate electrode 58, source electrode 60, and drain electrode 62. Reference numerals 70 and 74 designate insulating layers, and numeral 1 designates a substrate.

The pixel electrode 64 preferably overlaps the data lines 50 and 52 in equal areas. That is, the overlapped area "B" between reflective pixel electrode 64 and first data line 50 is substantially the same as the overlapped area "Ba" between reflective pixel electrode 64 and second data line 52 in order to reduce the cross talk. Furthermore, the overlapped areas "B" and "Ba" each substantially covers one-half of the data lines 50 and 52, respectively, defining a larger pixel region which in turn increases the aperture ratio.

In this embodiment, the polarity of the row selection voltage waveforms applied to each data line is preferably inverted or reversed at each frame. This is referred to as an alternating current drive scheme and is generally adapted for driving the LCD device.

Since the driving method for the LCD device is alternating current drive and the pixel electrode overlaps the first and second data lines in equal areas, each parasitic capacitance of "B" area and "Ba" area is equal and offsets each other, which can reduce crosstalk.

Since each pixel electrode 64 extends over one-half the length of data lines 50 and 52, substantially the whole length of each data line 50 (52) is covered by reflective pixel electrode 64, which can increase the aperture ratio of the device, and black matrix over data lines 50 and 52 are not necessary.

Various other modifications will be apparent to and can be readily made by those skilled in the art without departing from the scope and spirit of this invention. Accordingly, it is not intended that the scope of the claims appended hereto be limited to the description as set forth herein but rather that the claims be broadly construed.

What is claimed is:

1. A liquid crystal display device comprising:
   a substrate;
   first and second gate lines formed on the substrate;
   first and second data lines intersecting the first and second gate lines so as to define a first pixel region, wherein each one of the first and second data lines has longitudinally arranged first and second regions;
   a second pixel region adjacent to the first pixel region and adjacent to the second data line;
   an insulating film covering first and second gate lines and the first and the second data lines;
   a first pixel electrode disposed in the first pixel region, the first pixel electrode overlapping one of the first and the second regions of the first data line, and the first pixel electrode overlapping one of the first and second regions of the second data line;
   a second pixel electrode disposed in second pixel region, the second pixel electrode overlapping one of the first and second regions of the second data line that is not overlapped by the first pixel electrode; and
   a switching element disposed in the pixel region and connected between the second gate line and the pixel electrode.

2. The liquid crystal display device of claim 1, wherein the pixel electrode overlaps the first and the second data lines by whole width of the data lines and by a substantially one-half length of each one of the first and the second data lines.

3. The liquid crystal display device of claim 2, wherein the pixel electrode extends over the first region of the first date line and extends over the second region of the second data line.

4. The liquid crystal display device of claim 1, wherein the pixel electrode is a reflective pixel electrode.

5. The liquid crystal display device of claim 1, wherein the first and the second regions are approximately the same.

6. The liquid crystal display device of claim 1, wherein the liquid crystal display device is driven by an alternating current driving method.

7. The liquid crystal display device of claim 6, wherein the pixel electrode overlaps the first and the second data lines by whole width of the data lines and by a substantially one-half length of each one of the first and the second data lines.

8. The liquid crystal display device of claim 6, wherein the pixel electrode is a reflective pixel electrode.

9. The liquid crystal display device of claim 6, wherein the first and the second regions are approximately the same.

10. The liquid crystal display device of claim 6, wherein the pixel electrode extends over the first region of the first date line and extends over the second region of the second data line.

11. The liquid crystal display device of claim 1, wherein the pixel electrode extends over the first region of the first date line and extends over the second region of the second data line.

12. A method of manufacturing a liquid crystal display device, comprising the steps of:
    providing a substrate;
    forming first and second gate lines on the substrate;
    forming first and second data lines intersecting the first and second gate lines so as to define a first pixel region, wherein each one of the first and second data lines has longitudinally arranged first and second regions;
    forming a second pixel region adjacent to the first pixel region and adjacent to the second data line;
    forming an insulating film covering the first and second gate lines and the first and the second data lines;
    forming a switching element disposed in the pixel region and connected between the second gate line and the pixel electrode;
    forming a first pixel electrode in the first pixel region to overlap one of the first and the second regions of the first data line and to overlap one of the first and second regions of the second data line; and
    forming a second pixel electrode in the second pixel region to overlap one of the first and the second regions of the second data line that is not overlapped by the first pixel electrode.

13. The method of claim 12, wherein the pixel electrode overlaps the first and the second data lines by whole width of the data lines and by a substantially one-half length of each one of the first and the second data lines.

14. The method of claim 13, wherein the pixel electrode extends over the first region of the first date line and extends over the second region of the second data line.

15. The method of claim 12, wherein the pixel electrode is a reflective pixel electrode.

16. The method of claim 12, wherein the first and the second regions are approximately the same.

17. The method of claim 12, wherein the liquid crystal display device is driven by an alternating current driving method.

18. The method of claim 17, wherein the pixel electrode overlaps the first and the second data lines by whole width of the data lines and by a substantially one-half length of each one of the first and the second data lines.

19. The method of claim 17, wherein the pixel electrode is a reflective pixel electrode.

20. The liquid crystal display device of claim 17, wherein the first and the second regions are approximately the same.

21. The liquid crystal display device of claim 17, wherein the pixel electrode extends over the first region of the first date line and extends over the second region of the second data line.

22. The method of claim 12, wherein the pixel electrode extends over the first region of the first date line and extends over the second region of the second data line.

* * * * *